(12) United States Patent
Zhang

(10) Patent No.: US 11,863,901 B2
(45) Date of Patent: Jan. 2, 2024

(54) PHOTOGRAPHING METHOD AND TERMINAL

(71) Applicant: VIVO MOBILE COMMUNICATION CO., LTD., Guangdong (CN)

(72) Inventor: Su Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 84 days.

(21) Appl. No.: 17/535,525

(22) Filed: Nov. 24, 2021

(65) Prior Publication Data

US 2022/0086365 A1 Mar. 17, 2022

Related U.S. Application Data

(63) Continuation of application No. PCT/CN2020/084919, filed on Apr. 15, 2020.

(30) Foreign Application Priority Data

May 27, 2019 (CN) .......................... 201910446009.8

(51) Int. Cl.
*H04N 5/265* (2006.01)
*H04N 23/63* (2023.01)
(52) U.S. Cl.
CPC ........... *H04N 5/265* (2013.01); *H04N 23/632* (2023.01); *H04N 23/633* (2023.01)
(58) Field of Classification Search
CPC .... H04N 5/265; H04N 23/632; H04N 23/633; H04N 23/951
See application file for complete search history.

(56) References Cited

U.S. PATENT DOCUMENTS

| | | |
|---|---|---|
| 2013/0179816 A1 | 7/2013 | Seo et al. |
| 2015/0049214 A1 | 2/2015 | Liu et al. |
| 2015/0109639 A1* | 4/2015 | Ishibashi .............. G06F 3/1287 358/1.15 |
| 2018/0091736 A1 | 3/2018 | Pei et al. |

FOREIGN PATENT DOCUMENTS

| | | |
|---|---|---|
| CN | 104375755 A | 2/2015 |
| CN | 105635566 A | 6/2016 |
| CN | 105812650 A | 7/2016 |

(Continued)

OTHER PUBLICATIONS

Office Action issued by the Chinese Patent Office dated Jul. 2, 2020.

(Continued)

*Primary Examiner* — Yogesh K Aggarwal
(74) *Attorney, Agent, or Firm* — IP & T GROUP LLP

(57) ABSTRACT

A photographing method includes: receiving a first operation for a target photographing template, wherein the target template includes N viewfinder frames, and N is an integer greater than 1; acquiring N photographing results through the N viewfinder frames, wherein the N photographing results include M photos and N-M videos, and M is a positive integer less than N; and splicing the N photographing results according to the positions of the N viewfinder frames in the target photographing template in a case of receiving a second operation to acquire a synthesized object.

15 Claims, 5 Drawing Sheets

(56) References Cited

FOREIGN PATENT DOCUMENTS

| | | | |
|---|---|---|---|
| CN | 106303189 A | 1/2017 | |
| CN | 106937039 A | 7/2017 | |
| CN | 107707825 A | 2/2018 | |
| CN | 107872623 A * | 4/2018 | ........... G06T 3/4038 |
| CN | 107872623 A | 4/2018 | |
| CN | 108093166 A | 5/2018 | |
| CN | 108769511 A | 11/2018 | |
| CN | 109743610 A | 5/2019 | |
| CN | 110086998 A | 8/2019 | |
| JP | 2007-274581 A | 10/2017 | |
| WO | 2017101278 A1 | 6/2017 | |
| WO | 2018094979 A1 | 5/2018 | |

OTHER PUBLICATIONS

International Search Report and Written Opinion issued by the Chinese Patent Office dated Jul. 15, 2020.
EESR issued by EPO for Application No. EP20814205, dated Oct. 31, 2022.

* cited by examiner

US 11,863,901 B2

PHOTOGRAPHING METHOD AND TERMINAL

CROSS-REFERENCE TO RELATED APPLICATIONS

This application is a Bypass Continuation Application of PCT/CN2020/084919, filed on Apr. 15, 2020, which claims priority to Chinese Patent Application No. 201910446009.8, filed on May 27, 2019, which are incorporated herein by reference in their entirety.

TECHNICAL FIELD

Embodiments of the present disclosure relate to the technical field of communication, and in particular, to a photographing method and a terminal.

BACKGROUND

With the improvement of the photographing function of the terminal, more and more people take pictures or videos through the terminal and share the pictures or videos on a social platform. Users have higher and higher requirements on using terminals for photographing and sharing, so higher requirements on the photographing function of the terminal are also put forward.

However, at present, only pictures or videos can be acquired from the photographing result of users, which cannot meet the diverse requirements for users.

SUMMARY

Embodiments of the present disclosure provide a photographing method and a terminal.

According to a first aspect, the embodiments of the present disclosure provide a photographing method, applied to a terminal. The photographing method includes:
  receiving a first operation for a target photographing template, wherein the target photographing template includes N viewfinder frames and N is an integer greater than 1;
  acquiring N photographing results through the N viewfinder frames, wherein the N photographing results include M photos and N-M videos, and M is a positive integer less than N; and
  splicing the N photographing results according to the positions of the N viewfinder frames in the target photographing template in a case of receiving a second operation to acquire a synthesized object.

According to a second aspect, the embodiments of the present disclosure further provide a terminal, including:
  a receiving module, configured to receive a first operation for a target photographing template, wherein the target photographing template includes N viewfinder frames and N is an integer greater than 1;
  an acquisition module, configured to acquire N photographing results through the N viewfinder frames, wherein the N photographing results include M photos and N-M videos, and M is a positive integer less than N; and
  a synthesis module, configured to splice the N photographing results according to the positions of the N viewfinder frames in the target photographing template in a case of receiving a second operation to acquire a synthesized object.

According to a third aspect, the embodiments of the present disclosure further provide a terminal, including a processor, a memory, and a computer program stored in the memory and executable on the processor, wherein when the computer program is executed by the processor, the steps of the above photographing method are implemented.

According to a fourth aspect, the embodiments of the present disclosure further provide a non-transitory computer-readable storage medium, wherein the non-transitory computer-readable storage medium stores a computer program; and when the computer program is executed by a processor, the steps of the above photographing method are implemented.

BRIEF DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments acquired by a person of ordinary skill in the art based on the embodiments of the present disclosure shall fall within the protection scope of the present disclosure.

Figure 1:
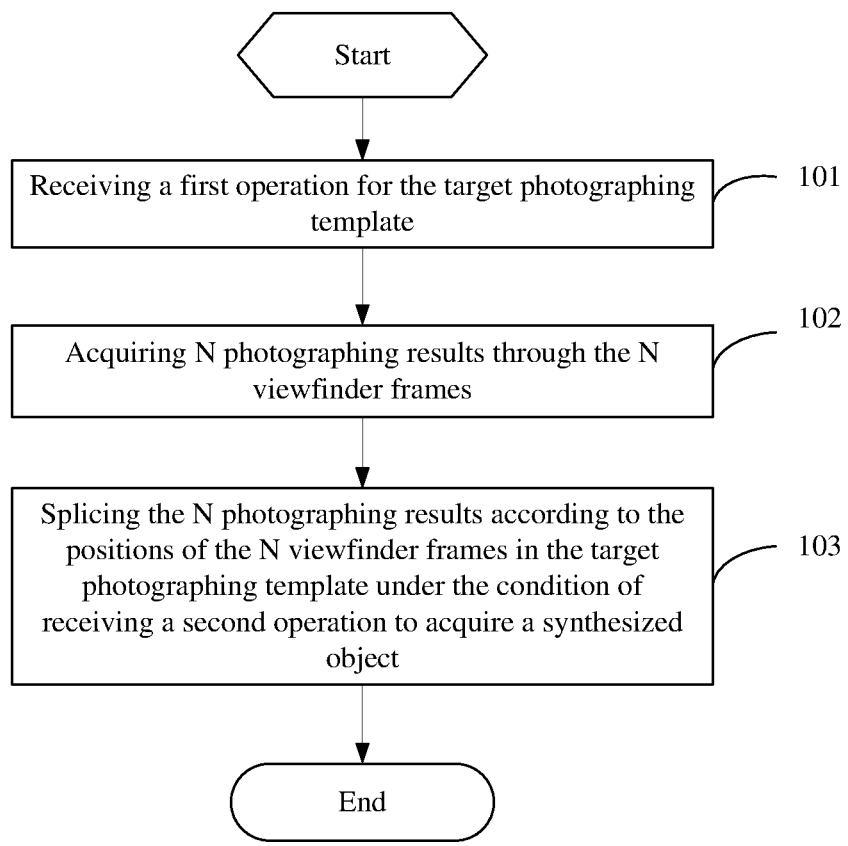
FIG. 1 is a flowchart of a photographing method according to an embodiment of the present disclosure.

Referring to FIG. 1, FIG. 1 is a first flowchart of a photographing method according to an embodiment of the present disclosure. As shown FIG. 1, the embodiment provides a photographing method, applied to a terminal. The method includes the following steps:
  step 101: receiving a first operation for a target photographing template, wherein the target photographing template includes N viewfinder frames and N is an integer greater than 1.

The first operation is an operation of selecting the target photographing template. The first operation may be a clicking operation, a sliding operation and the like, which is not limited herein. The target photographing template may be downloaded from the network, and may also use a template in the factory settings in the terminal. The target photographing template may be pre-stored in the terminal, or may also be acquired in real time during use. In a case that the pre-stored target photographing template is selected, each target photographing template has the number of the corresponding viewfinder frames, the relative position of each viewfinder frame, and the shape of the viewfinder frame. The shape of the viewfinder frame may be square, triangle, circle or other shapes.

When the target photographing template is acquired in real time, image recognition may be performed through a to-be-recognized picture to acquire the target photographing template, so as to meet the diverse requirements of users and improve interestingness. When the target photographing template is acquired in real time, the to-be-recognized picture is determined first, then image recognition is performed on the to-be-recognized picture, and a preset pattern in the to-be-recognized picture is recognized. For example, the to-be-recognized picture includes a door and a television screen, and the preset pattern is a rectangle. The outlines of the door and the television screen may be matched with the rectangle, so when the preset pattern in the to-be-recognized picture is recognized, areas where the door and the television screen in the to-be-recognized picture are located will be recognized.

The area matched with the preset pattern in the to-be-recognized picture is determined as the viewfinder frame. In a case of that it is determined that there is more than one viewfinder frame of the to-be-recognized picture, the to-be-recognized picture may serve as the target photographing template, wherein the area matched with the preset pattern in the to-be-recognized picture serves as the viewfinder frame of the target photographing template.

The target photographing template at least includes two viewfinder frames, that is, N is a positive integer greater than 1.

Step 102: acquiring N photographing results through the N viewfinder frames, wherein the N photographing results include M photos and N-M videos, and M is a positive integer less than N.

Figure 2:
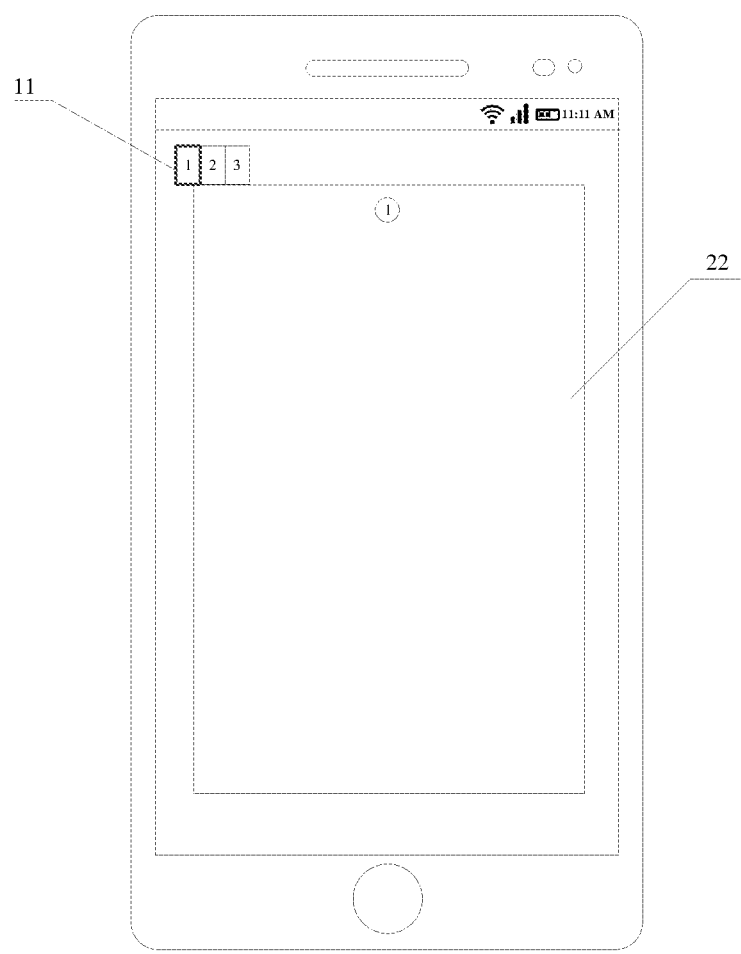
FIG. 2 to FIG. 3 are display schematic diagrams of a display screen of a terminal according to an embodiment of the present disclosure.

Optionally, after the target photographing template is determined, prompt boxes corresponding to N viewfinder frames are displayed on the display screen of the terminal, and one viewfinder frame (may be regarded as the current viewfinder frame) may also be displayed on the display screen, wherein the viewfinder frame corresponds to one prompt box in the N prompt boxes. As shown in FIG. 2, three prompt boxes are displayed in the figure, the reference number 11 shows the prompt box, and the reference numeral 22 shows the viewfinder frame. For the prompt box corresponding to the viewfinder frame displayed on the display screen, the prompt frame may be highlighted, which is displayed in the form of bolding the frame of the prompt box in FIG. 2. For example, when a first image is photographed, the viewfinder frame displayed on the display screen corresponds to a first prompt box in the N prompt box. After photographing is completed, the photographing result acquired through photographing is displayed in the first prompt box in the form of thumbnail.

When photographing is performed through the viewfinder frame, a photographing key may be pressed for a long time, and the long-press time may be set according to the actual condition, such as 3 seconds. A user may slide on the viewfinder frame left and right to switch the viewfinder frames corresponding to different prompt boxes, or a user may select different prompt boxes in the N prompt boxes to switch the viewfinder frame displayed on the display screen.

Initially, each of the N prompt boxes does not display a picture, or displays a default picture. After the photographing result is acquired through the viewfinder frame corresponding to the prompt box, the acquired photographing result is displayed in the corresponding prompt box. Optionally, a user may view the photographing result corresponding to the thumbnail in the prompt box by clicking the prompt box, for example, the photographing result corresponding to the thumbnail in the prompt box is displayed in full screen on the mobile terminal. Optionally, the photographing result may be edited. For example, the photographing result is beautified, or the text is added to the photographing result.

When N photographing results matched to the N viewfinder frames are acquired, photographing may be performed respectively through the N viewfinder frames to acquire N photographing results, and photographing may be performed through part of the N viewfinder frames to acquire part of the photographing results. Then, the N photographing results are finally acquired by copying the acquired photographing results, wherein the N photographing result include photos and videos. Each photographing result is a photo (also called picture) or video image. Each viewfinder frame corresponds to one photographing result.

Step 103: splicing the N photographing results according to the positions of the N viewfinder frames in the target photographing template in a case of receiving a second operation to acquire a synthesized object.

The second operation is an operation of splicing the N photographing results to acquire the synthesized object. The second operation may be a clicking operation, a sliding operation and the like, which is not limited herein.

The N photographing results are spliced according to the positions of the N viewfinder frames in the target photographing template. For example, in a case that the first viewfinder frame is above the second viewfinder frame in the target photographing template, during splicing, the photographing result acquired through the first viewfinder frame will be spliced above the photographing result acquired through the second viewfinder frame, that is, in the synthesized object, the photographing result acquired through the first viewfinder frame is located above the photographing result acquired through the second viewfinder frame.

After the synthesized object is acquired, the synthesized object may be further shared to a social platform. After the photographing results are acquired, a synthesized image can be acquired only through the second operation without adding too many additional operations, so that user operation is simplified. Furthermore, in the subsequent sharing, a user only needs to select an object for one time to share photos and videos at the same time instead of selecting the photo and then selecting the video like related art that at least two object selecting operations are required to share photos and videos. The method in this embodiment may be used to synthesize the picture and the video image.

In the embodiments, the terminal may be any terminal including a camera, such as a mobile phone, a tablet personal computer, a laptop computer a personal digital assistant (PDA), a mobile Internet device (MID) or a wearable device.

In the embodiments of the present disclosure, the photographing method includes: receiving a first operation for a target photographing template, wherein the target template includes N viewfinder frames, and N is an integer greater than 1; acquiring N photographing results through the N viewfinder frames, wherein the N photographing results include M photos and N-M videos, and M is a positive integer less than N; and splicing the N photographing results according to the positions of the N viewfinder frames in the target photographing template in a case of receiving a second operation to acquire a synthesized object. In this way, there are photos and videos in the finally acquired photographing result, which meet the requirement of users to take photos and videos at the same time. In a case that it necessary to share photos and videos subsequently, it is only necessary to select objects for one time and then share them, and it is unnecessary to select photos and videos for many times and then share them.

Optionally, the step of acquiring the N photographing results through the N viewfinder frames includes:
  acquiring images displayed in the N viewfinder frames respectively to acquire N photographing results;
  or
  acquiring images displayed in J viewfinder frames of the N viewfinder frames respectively to acquire J photographing results; and performing copy processing on M photographing results in the J photographing results to acquire K photographing results corresponding to K viewfinder frames,
  wherein the sum of J and K is equal to N, and M is less than or equal to K.

Optionally, when the N photographing results corresponding to the N viewfinder frames are acquired, photographing may be performed respectively through the N viewfinder frames to acquire N photographing results; and photographing may be performed for J times through J viewfinder frames of the N viewfinder frames to acquire J photographing results, and then M photographing results in the J photographing results are copied to acquire K photographing results corresponding to K viewfinder frames. The K viewfinder frames are viewfinder frames without corresponding to the photographing result, or the photographing results corresponding to the K viewfinder frames are not acquired through photographing, for example, through copying.

When M is less than K, one or more of the M photographing results may be copied for many times to acquire the K photographing results corresponding to the K viewfinder frames. When M is equal to K, each of the M photographing results may be copied for one time respectively to acquire the K photographing results corresponding to the K viewfinder frames.

The sum of J and K is equal to N, which may be understood that the K viewfinder frames do not overlap with the viewfinder frames corresponding to each of the J photographing results. In this way, after copy processing, the photographing results corresponding to the N viewfinder frames are divided into two parts through acquisition routes: the J photographing results are acquired through photographing of their own corresponding viewfinder frames, and each photographing result in the K viewfinder frames is acquired through copying.

Certainly, the sum of J and K may be greater than N, which may be understood that K viewfinder frames include viewfinder frames which do not acquire the photographing results, and viewfinder frames corresponding to part of the J photographing results.

In this embodiment, images displayed in the N viewfinder frames are acquired respectively to acquire N photographing results; or images displayed in J viewfinder frames of the N viewfinder frames are acquired respectively to acquire J photographing results; and the M photographing results in the J photographing results are copied to acquire K photographing results corresponding to K viewfinder frames, wherein the sum of the J and K is equal to N, and M is less than or equal to K. In this way, the N photographing results may be acquired in a diversified manner, and the interestingness may be improved.

Optionally, the step of copying the M photographing results in the J photographing results to acquire the K photographing results corresponding to the K viewfinder frames includes:
  in a case of receiving a first sliding operation sliding from a t-th viewfinder frame to an h-th viewfinder frame, copy the photographing result corresponding to the t-th viewfinder frame to the h-th viewfinder frame to acquire the photographing result of the h-th viewfinder frame;
  or
  in a case of receiving a second sliding operation sliding from the t-th viewfinder frame to the h-th viewfinder frame, copy the photographing result corresponding to the t-th viewfinder frame to a target viewfinder frame to acquire the photographing result of the target viewfinder frame, wherein the target viewfinder frame includes all the viewfinder frames except for the t-th viewfinder frame on a sliding route of the second sliding operation,
  the photographing result corresponding to the t-th viewfinder frame being one of the M photographing results in the J photographing results, and the h-th viewfinder frame being one of the K viewfinder frames.

Figure 3:
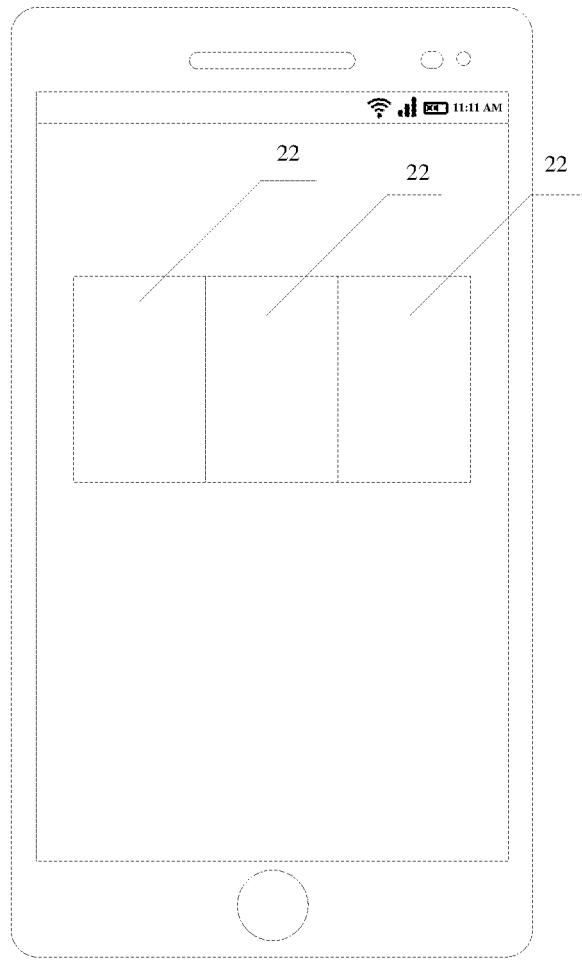

Optionally, in a case that N viewfinder frames are displayed on the display screen, the corresponding photographing result is displayed in the viewfinder frame, and for a viewfinder frame which does not acquire the photographing result, a default picture is displayed in the viewfinder frame. As shown in FIG. 3, N viewfinder frames are displayed on the display screen. The First operation may be a single-finger clicking operation, which is not limited specifically. In a case that a first sliding operation sliding from a t-th viewfinder frame to an h-th viewfinder frame is received, the photographing result corresponding to the t-th viewfinder frame is copied to the h-th viewfinder frame. In this way, the photographing result corresponding to the h-th viewfinder frame is as same as the photographing result corresponding to the t-th viewfinder frame (for example, the contents of the photographing results are the same). The photographing result corresponding to the t-th viewfinder frame is one of the M photographing results, and the h-th viewfinder frame is one of the K viewfinder frames. In this way, the photographing result corresponding to the t-th viewfinder frame may be copied to the h-th viewfinder frame rapidly through the first sliding operation.

The second sliding operation may be a double-finger sliding operation, which is not limited specifically. In a case that the second sliding operation sliding from the t-th viewfinder frame to the h-th viewfinder frame is received, the photographing result corresponding to the t-th viewfinder frame will be copied to the target viewfinder frame to acquire the photographing result corresponding to the target viewfinder frame, wherein the target viewfinder frame is all the viewfinder frames except for the t-th viewfinder frame on the sliding route of the second sliding operation. In this way, when it is necessary to copy the photographing result corresponding to the t-th viewfinder frame to a plurality of viewfinder frames, the above method may be adopted. The photographing result corresponding to the t-th viewfinder frame may be copied to the plurality of viewfinder frames rapidly through the second sliding operation.

Optionally, the step of acquiring the N photographing results through the N viewfinder frames includes:
  in a case that an image type which a first viewfinder frame in the N viewfinder frames is correspondingly set is a photo in the target photographing template, acquiring the photo through the first viewfinder frame in a case of receiving a photographing operation; and in a case that an image type which a second viewfinder frame in the N viewfinder frames is correspondingly set is a video in the target photographing template, acquiring the video through the second viewfinder frame in a case of receiving a photographing operation, wherein the first viewfinder frame is one of the M viewfinder frames, and the second viewfinder frame is one of the N-M viewfinder frames except for the M viewfinder frames in the N viewfinder frames.

In the target photographing template, an image type is correspondingly set for each viewfinder frame in advance, and the image type includes photos or videos. For the viewfinder frame of which the image type is a photo, the acquired photographing result is a photo in a case of receiving the photographing operation; and for the viewfinder frame of which the image type is a video, the acquired photographing result is a video in a case of receiving the photographing operation. In this way, for each viewfinder frame, a user only needs to input the photographing operation to acquire the photographing result corresponding to the image type of each viewfinder frame; and the user does not need to adjust the photographing mode again, such as adjusting the photographing mode as a picture mode or a video mode, so that the user operation can be simplified, and the user experience can be improved.

Optionally, before the step of receiving the first operation for the target photographing template, the method further includes:

photographing through the terminal to acquire one photographing result.

The step of acquiring the N photographing results through the N viewfinder frames includes:

acquiring images displayed in N-1 viewfinder frames respectively to acquire N-1 photographing results; and taking the one photographing result and the N-1 photographing result as N photographing results acquired through the N viewfinder frames. The one photographing result is matched with one of the N viewfinder frames except for the N-1 viewfinder frame.

In this embodiment, one photographing result is acquired firstly through the terminal, and then the target photographing template is determined. Since one photographing result is acquired before the target photographing template is determined, photographing is performed respectively according to N-1 viewfinder frames after the target photographing template is determined to acquire N-1 photographing results. The one photographing result has a default matched viewfinder frame, for example, a first viewfinder frame in the target photographing template, or a viewfinder frame located at the middle position of the target photographing template, or a last viewfinder frame in the target photographing template. The viewfinder frame matched with the photographing result by default may be set according to the actual condition, which is not limited herein.

The one photographing result is matched with one viewfinder frame in the N viewfinder frames except for the N-1 viewfinder frames, which may be understood that the target photographing template includes N viewfinder frames, the N viewfinder frames are composed of the default matched viewfinder frame and N-1 viewfinder frames, the one photographing result acquired through photographing before the target photographing template is determined is matched with the default matched viewfinder frame, and the N-1 photographing results acquired after the target photographing template is determined are matched with the N-1 viewfinder frames.

In this embodiment, before the step of receiving the first operation for the target photographing template, the method further includes: photographing through the terminal to acquire one photographing result; acquiring images displayed in N-1 viewfinder frames respectively to acquire N-1 photographing results; and taking the one photographing result and the N-1 photographing result as N photographing results acquired through the N viewfinder frames. In this way, the target photographing template may be selected after one photographing result is acquired through photographing, so that the determination time of selecting the target photographing template is further flexible, the diversified requirements of users are met, and the user experience is improved.

Optionally, after the step of acquiring the N photographing results through the N viewfinder frames, the method further includes:

in a case of receiving a third operation of a user for a first result in the N photographing results, displaying a text editing box in the first result.

Optionally, the first result is one photographing result in the N photographing results. After the N photographing results matched with the N viewfinder frames are acquired, the N photographing results may be displayed. In a case that a third operation of a user for the first result in the N photographing results is received, a text edit box is displayed on the first result, and the user may add text in the first result through the text edit box. For example, the third operation may be a double-click operation. A user double-clicks on the first result, may insert the text edit box at the double-click position, and may add text to the first result through the text edit box.

Figure 4:
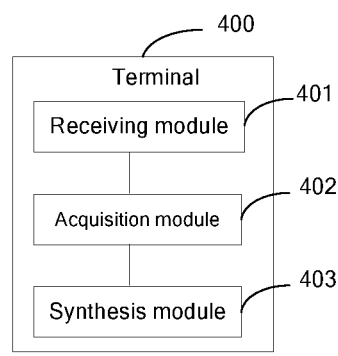
FIG. 4 is a first structural diagram of a terminal according to an embodiment of the present disclosure.

Referring to FIG. 4, it is a first structural diagram of a terminal according to an embodiment of the present disclosure. As shown in FIG. 4, the embodiment provides a terminal 400, including:

a receiving module 401, configured to receive a first operation for a target photographing template, wherein the target photographing template includes N viewfinder frames and N is an integer greater than 1;

an acquisition module 402, configured to acquire N photographing results through the N viewfinder frames, wherein the N photographing results include M photos and N-M videos, and M is a positive integer less than N; and a synthesis module 403, configured to splice the N photographing results according to the positions of the N viewfinder frames in the target photographing template in a case of receiving a second operation to acquire a synthesized object.

Figure 5:
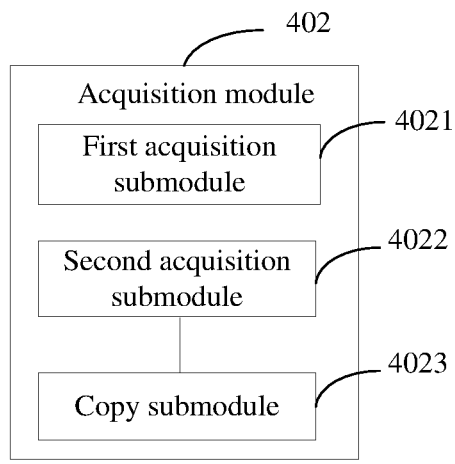
FIG. 5 is a structural diagram of an acquisition module according to an embodiment of the present disclosure.

Optionally, as shown in FIG. 5, the acquisition module 402 includes:

a first acquisition submodule 4021, configured to acquire images displayed in the N viewfinder frames respectively to acquire N photographing results;

or a second acquisition submodule 4022, configured to acquire images displayed in J viewfinder frames in the N viewfinder frames respectively to acquire J photographing results; and a copy submodule 4023, configured to perform copy processing on M photographing results in the J photographing results to acquire K photographing results corresponding to K viewfinder frames, wherein the sum of J and K is equal to N, and M is less than or equal to K.

Optionally, the copy submodule 4023 is configured to:

in a case of receiving a first sliding operation sliding from a t-th viewfinder frame to an h-th viewfinder frame, copy the photographing result corresponding to the t-th viewfinder frame to the h-th viewfinder frame to acquire the photographing result of the h-th viewfinder frame;

or in a case of receiving a second sliding operation sliding from the t-th viewfinder frame to the h-th viewfinder frame, copy the photographing result corresponding to the t-th viewfinder frame to a target viewfinder frame to acquire the photographing result of the target viewfinder frame, wherein the target viewfinder frame includes all the viewfinder frames except for the t-th viewfinder frame on a sliding route of the second sliding operation, wherein the photographing result corresponding to the t-th viewfinder frame is one of the M photographing results in the J photographing results, and the h-th viewfinder frame is one of the K viewfinder frames.

Optionally, the acquisition module 402 is configured to:

in a case that an image type which a first viewfinder frame in the N viewfinder frames is correspondingly set is a photo in the target photographing template, acquire the photo through the first viewfinder frame in a case of receiving a photographing operation; and in a case that an image type which a second viewfinder frame in the N viewfinder frames is correspondingly set is a video in the target photographing template, acquire the video through the second viewfinder frame in a case of receiving a photographing operation, wherein the first viewfinder frame is one of the M viewfinder frames, and the second viewfinder frame is one of the N-M viewfinder frames except for the M viewfinder frames in the N viewfinder frames.

Figure 6:
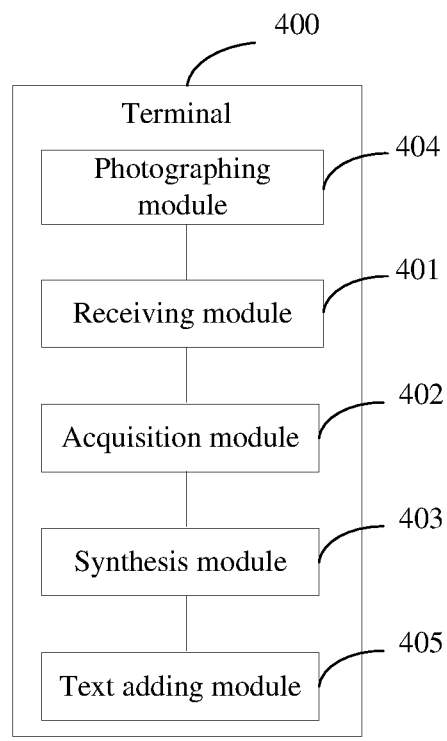
FIG. 6 is a second structural diagram of a terminal according to an embodiment of the present disclosure.

Optionally, as shown in FIG. 6, the terminal 400 further includes:

a photographing module 404, configured to photograph through the terminal to acquire one photographing result.

The acquisition module 402 is configured to:

acquire images displayed in N-1 viewfinder frames respectively to acquire N-1 photographing results; and take the one photographing result and the N-1 photographing result as N photographing results acquired through the N viewfinder frames.

Optionally, as shown in FIG. 6, the terminal 400 further includes:

a text adding module 405, configured to, in a case of receiving a third operation of a user for a first result in the N photographing results, display a text editing box in the first result.

The terminal 400 can implement the processes implemented by the terminal in the method embodiments in FIG. 1. To avoid repetition, details are not described herein again.

According to the terminal 400 provided by the embodiments of the present disclosure, a first operation for a target photographing template is received, wherein the target template includes N viewfinder frames, and N is an integer greater than 1; N photographing results are acquired through the N viewfinder frames, wherein the N photographing results include M photos and N-M videos, and M is a positive integer less than N; and the N photographing results are spliced according to the positions of the N viewfinder frames in the target photographing template in a case of receiving a second operation to acquire a synthesized object. In this way, there are photos and videos in the finally acquired photographing result, which meet the requirement of users to take photos and videos at the same time. In a case that it necessary to share photos and videos subsequently, it is only necessary to select objects for one time and then share them, and it is unnecessary to select photos and videos for many times and then share them.

Figure 7:
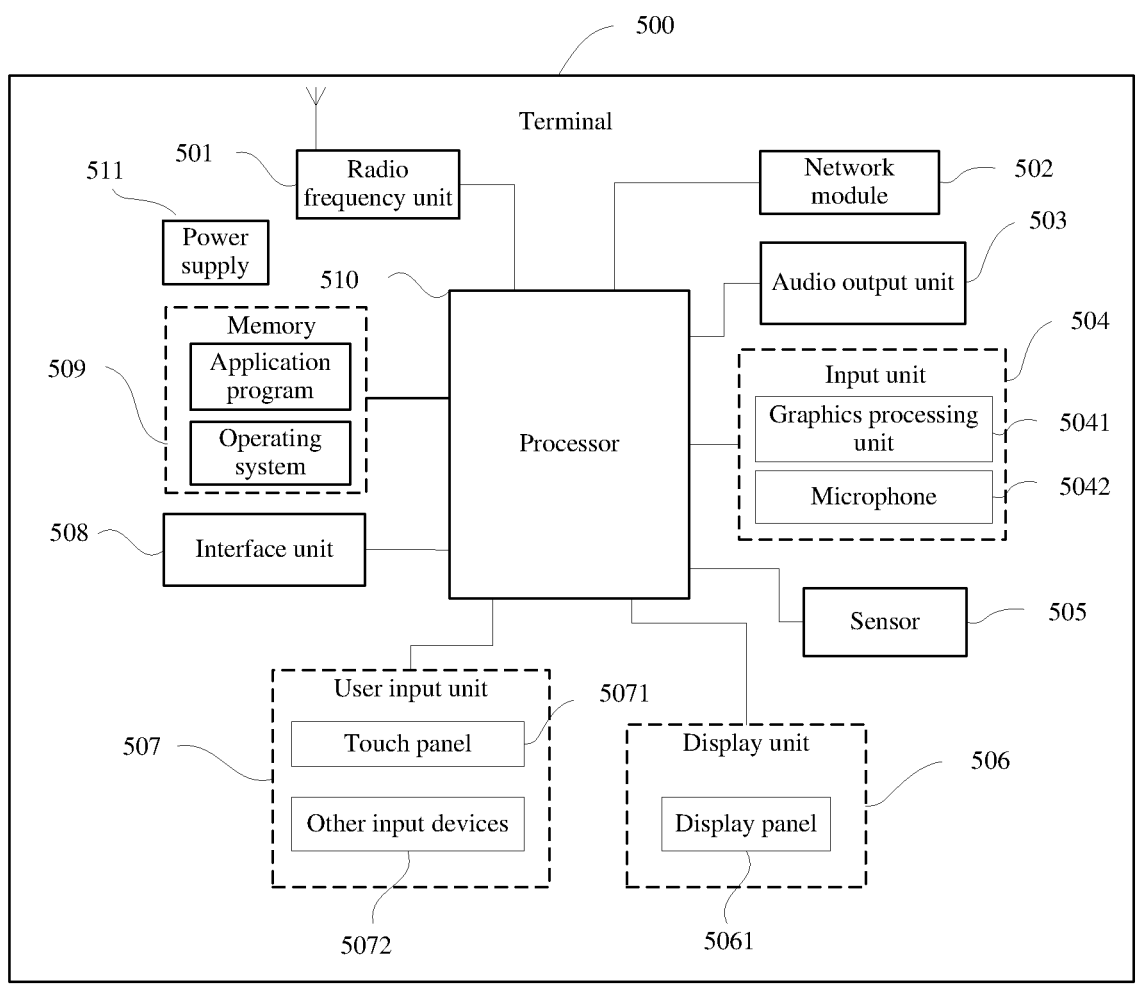
FIG. 7 is a structural diagram of a terminal according to another embodiment of the present disclosure.

FIG. 7 is a schematic diagram of a hardware structure of a terminal according to each embodiment of the present disclosure. As shown in FIG. 7, the terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 510 is configured to receive a first operation for a target photographing template, wherein the target photographing template includes N viewfinder frames and N is an integer greater than 1;

acquire N photographing results through the N viewfinder frames, wherein the N photographing results include M photos and N-M videos, and M is a positive integer less than N; and splice the N photographing results according to the positions of the N viewfinder frames in the target photographing template in a case of receiving a second operation to acquire a synthesized object.

Optionally, the processor 510 is configured to acquire images displayed in the N viewfinder frames respectively to acquire N photographing results;

or acquire images displayed in J viewfinder frames of the N viewfinder frames respectively to acquire J photographing results; and perform copy processing on M photographing results in the J photographing results to acquire K photographing results corresponding to K viewfinder frames, wherein the sum of J and K is equal to N, and M is less than or equal to K.

Optionally, the processor 510 is configured to, in a case of receiving a first sliding operation sliding from a t-th viewfinder frame to an h-th viewfinder frame, copy the photographing result corresponding to the t-th viewfinder frame to the h-th viewfinder frame to acquire the photographing result of the h-th viewfinder frame;

or in a case of receiving a second sliding operation sliding from the t-th viewfinder frame to the h-th viewfinder frame, copy the photographing result corresponding to the t-th viewfinder frame to a target viewfinder frame to acquire the photographing result of the target viewfinder frame, wherein the target viewfinder frame includes all the viewfinder frames except for the t-th viewfinder frame on a sliding route of the second sliding operation, wherein the photographing result corresponding to the t-th viewfinder frame is one of the M photographing results in the J photographing results, and the h-th viewfinder frame is one of the K viewfinder frames.

Optionally, the processor 510 is configured to, in a case that an image type which a first viewfinder frame in the N viewfinder frames is correspondingly set is a photo in the target photographing template, acquire the photo through the first viewfinder frame in a case of receiving a photographing operation; and in a case that an image type which a second viewfinder frame in the N viewfinder frames is correspondingly set is a video in the target photographing template, acquire the video through the second viewfinder frame in a case of receiving a photographing operation, wherein the first viewfinder frame is one of the M viewfinder frames, and the second viewfinder frame is one of the N-M viewfinder frames except for the M viewfinder frames in the N viewfinder frames.

Optionally, the processor 510 is further configured to:

photograph through the terminal to acquire one photographing result;

acquire images displayed in N-1 viewfinder frames respectively to acquire N-1 photographing results; and take the one photographing result and the N-1 photographing result as N photographing results acquired through the N viewfinder frames.

Optionally, the processor 510 is further configured to, in a case of receiving a third operation of a user for a first result in the N photographing results, display a text editing box in the first result.

The terminal 500 can implement the processes implemented by the terminal in the foregoing embodiments and achieve the beneficial effects. To avoid repetition, details are not described herein again.

According to the terminal 500 provided by the embodiments of the present disclosure, a first operation for a target photographing template is received, wherein the target template includes N viewfinder frames, and N is an integer greater than 1; N photographing results are acquired through the N viewfinder frames, wherein the N photographing results include M photos and N-M videos, and M is a positive integer less than N; and the N photographing results are spliced according to the positions of the N viewfinder frames in the target photographing template in a case of receiving a second operation to acquire a synthesized object. In this way, there are photos and videos in the finally acquired photographing result, which meet the requirement of users to take photos and videos at the same time. In a case that it necessary to share photos and videos subsequently, it is only necessary to select objects for one time and then share them, and it is unnecessary to select photos and videos for many times and then share them.

It should be understood that in this embodiment of the present disclosure, the radio frequency unit 501 may be configured to receive and send signals in a process of receiving and sending information or calling. For example, after receiving downlink data from a base station, the radio frequency unit 501 sends the downlink data to the processor 510 for processing; and sends uplink data to the base station. Generally, the radio frequency unit 501 includes, but is not limited to, an antenna, at least one amplifier, a transceiver, a coupler, a low noise amplifier, and a duplexer, and the like. In addition, the radio frequency unit 501 may further communicate with a network and another device by using a wireless communication system.

The terminal provides wireless broadband Internet access for the user by using the network module 502, for example, helping the user to send and receive an e-mail, browse a web page, and access streaming media.

The audio output unit 503 may convert audio data received by the radio frequency unit 501 or the network module 502 or stored in the memory 509 into an audio signal and output as voice. Moreover, the audio output unit 503 may further provide audio output related to a specific function performed by the terminal 500 (such as a call signal reception sound, a message reception sound, or the like). The audio output unit 503 includes a speaker, a buzzer, a telephone receiver, etc.

The input unit 504 is configured to receive an acoustic signal or a video signal. The input unit 504 may include a graphics processing unit (GPU) 5041 and a microphone 5042. The graphics processing unit 5041 processes image data of a static image or video acquired by an image capture apparatus (such as, a camera) in a video capture mode or an image capture mode. A processed image frame may be displayed on the display unit 506. The image frame processed by the graphics processing unit 5041 may be stored in the memory 509 (or another storage medium) or transmitted via the radio frequency unit 501 or the network module 502. The microphone 5042 may receive a sound and can process such sound into audio data. The processed audio data may be converted, in a call mode, into a format that can be sent to a mobile communication base station by using the radio frequency unit 501 for output.

The terminal 500 further includes at least one sensor 505, such as a light sensor, a motion sensor and another sensor. The light sensor includes an ambient light sensor and a proximity sensor. The ambient light sensor may adjust luminance of the display panel 5061 based on brightness of ambient light. The proximity sensor may turn off the display panel 5061 and/or backlight when the terminal 500 moves to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by the user or information provided for the user. The display unit 506 may include a display panel 5061, and the display panel 5061 may be configured in a form of a liquid crystal display (LCD), an organic light-emitting diode (OLED), or the like.

The user input unit 507 may be configured to: receive input digit or character information, and generate key signal input related to user setting and function control of the terminal. The user input unit 507 includes a touch panel 5071 and another input device 5072. The touch panel 5071, also called a touch screen, may collect touch operation on or near the touch panel by users (for example, operation on the touch panel 5071 or near the touch panel 5071 by fingers or any suitable objects or accessories such as a touch pen by the users). The touch panel 5071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray, and a surface acoustic wave. In addition to the touch panel 5071, the user input unit 507 may further include other input devices 5072. The other input devices 5072 may include but are not limited to: a physical keyboard, a function key (such as a volume control key, a switch key), a trackball, a mouse, and a joystick, which is no longer repeated here.

Optionally, the touch panel 5071 may cover the display panel 5061. When detecting the touch operation on or near the touch panel 5071, the touch panel 5071 transmits the touch operation to the processor 510 to determine a type of the touch event, and then the processor 510 provides corresponding visual output on the display panel 5061 based on the type of the touch event. Although in FIG. 5, the touch panel 5071 and the display panel 5061 are used as two independent components to implement input and output functions of the terminal, in some embodiments, the touch panel 5071 and the display panel 5061 may be integrated to implement the input and output functions of the mobile terminal. This is not specifically limited herein.

The interface unit 508 is an interface for connecting an external apparatus to the terminal 500. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal, and connects all parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 can include one or more processing units. The processor 510 can be integrated with an application processor and a modem processor. The application processor mainly processes the operating system, the user interface, applications, etc. The modem processor mainly processes wireless communication. It can be understood that, alternatively, the modem processor may not be integrated into the processor 510.

The terminal 500 may further include the power supply 511 (such as a battery) that supplies power to each component. The power supply 511 may be logically connected to the processor 510 by using a power management system, so as to implement functions such as charging, discharging, and power consumption management by using the power management system.

In addition, the terminal 500 includes some function modules not shown. Details are not described herein.

An embodiment of the present disclosure further provides a terminal, including a processor 510, a memory 509, and a computer program that stored in the memory 509 and executable on the processor 510. When the computer program is executed by the processor 510, the foregoing processes of the photographing method embodiment are implemented, and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the photographing method embodiment are implemented, and a same technical effect can be achieved. To avoid repetition, details are not described herein again. The non-transitory computer-readable storage medium is, for example, a read only memory (ROM), a random access memory (RAM), a magnetic disk, or an optical disk.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A photographing method, applied to a terminal and comprising:
   receiving a first operation for a target photographing template, wherein the target photographing template comprises N viewfinder frames and N is an integer greater than 1;
   acquiring N photographing results through the N viewfinder frames, wherein the N photographing results comprise M photos and N-M videos, and M is a positive integer less than N; and
   splicing the N photographing results according to positions of the N viewfinder frames in the target photographing template in a case of receiving a second operation to acquire a synthesized object; wherein
   the acquiring the N photographing results through the N viewfinder frames comprises:
   acquiring images displayed in J viewfinder frames of the N viewfinder frames respectively to acquire J photographing results; and performing copy processing on M photographing results in the J photographing results to acquire K photographing results corresponding to K viewfinder frames, a sum of J and K being equal to N, and M being less than or equal to K.

2. The method according to claim 1, wherein the performing copy processing on the M photographing results in the J photographing results to acquire the K photographing results corresponding to the K viewfinder frames comprises:
   in a case of receiving a first sliding operation sliding from a t-th viewfinder frame to an h-th viewfinder frame, copying the photographing result corresponding to the t-th viewfinder frame to the h-th viewfinder frame to acquire the photographing result of the h-th viewfinder frame; or
   in a case of receiving a second sliding operation sliding from the t-th viewfinder frame to the h-th viewfinder frame, copying the photographing result corresponding to the t-th viewfinder frame to a target viewfinder frame to acquire the photographing result of the target viewfinder frame, the target viewfinder frame comprising all the viewfinder frames except for the t-th viewfinder frame on a sliding route of the second sliding operation; wherein
   the photographing result corresponding to the t-th viewfinder frame is one of the M photographing results in the J photographing results, and the h-th viewfinder frame is one of the K viewfinder frames.

3. The method according to claim 1, wherein the acquiring the N photographing results through the N viewfinder frames comprises:
   in a case that an image type which a first viewfinder frame in the N viewfinder frames is correspondingly set is a photo in the target photographing template, acquiring the photo through the first viewfinder frame in a case of receiving a photographing operation; and
   in a case that an image type which a second viewfinder frame in the N viewfinder frames is correspondingly set is a video in the target photographing template, acquiring the video through the second viewfinder frame in a case of receiving a photographing operation; wherein
   the first viewfinder frame is one of the M viewfinder frames, and the second viewfinder frame is one of the N-M viewfinder frames except for the M viewfinder frames in the N viewfinder frames.

4. The method according to claim 1, wherein before the receiving the first operation for the target photographing template, the method further comprises:
   photographing through the terminal to acquire one photographing result; and
   the acquiring the N photographing results through the N viewfinder frames comprises:
   acquiring images displayed in N-1 viewfinder frames respectively to acquire N-1 photographing results; and
   taking the one photographing result and the N-1 photographing result as N photographing results acquired through the N viewfinder frames.

5. The method according to claim 1, wherein after the acquiring the N photographing results through the N viewfinder frames further comprises:
   in a case of receiving a third operation of a user for a first result in the N photographing results, displaying a text editing box in the first result.

6. A terminal, comprising a processor, a memory, and a computer program stored in the memory and executable on the processor, wherein the computer program, when executed by the processor, causes the terminal to perform:
   receiving a first operation for a target photographing template, wherein the target photographing template comprises N viewfinder frames and N is an integer greater than 1;
   acquiring N photographing results through the N viewfinder frames, wherein the N photographing results comprise M photos and N-M videos, and M is a positive integer less than N;
   splicing the N photographing results according to positions of the N viewfinder frames in the target photographing template in a case of receiving a second operation to acquire a synthesized object; and
   acquiring images displayed in J viewfinder frames of the N viewfinder frames respectively to acquire J photographing results; and performing copy processing on M photographing results in the J photographing results to acquire K photographing results corresponding to K viewfinder frames, a sum of J and K being equal to N, and M being less than or equal to K.

7. The terminal according to claim 6, wherein the computer program, when executed by the processor, causes the terminal to perform:
   in a case of receiving a first sliding operation sliding from a t-th viewfinder frame to an h-th viewfinder frame, copying the photographing result corresponding to the t-th viewfinder frame to the h-th viewfinder frame to acquire the photographing result of the h-th viewfinder frame; or
   in a case of receiving a second sliding operation sliding from the t-th viewfinder frame to the h-th viewfinder frame, copying the photographing result corresponding to the t-th viewfinder frame to a target viewfinder frame to acquire the photographing result of the target viewfinder frame, the target viewfinder frame comprising all the viewfinder frames except for the t-th viewfinder frame on a sliding route of the second sliding operation; wherein
   the photographing result corresponding to the t-th viewfinder frame is one of the M photographing results in the J photographing results, and the h-th viewfinder frame is one of the K viewfinder frames.

8. The terminal according to claim 6, wherein the computer program, when executed by the processor, causes the terminal to perform:

in a case that an image type which a first viewfinder frame in the N viewfinder frames is correspondingly set is a photo in the target photographing template, acquiring the photo through the first viewfinder frame in a case of receiving a photographing operation; and in a case that an image type which a second viewfinder frame in the N viewfinder frames is correspondingly set is a video in the target photographing template, acquiring the video through the second viewfinder frame in a case of receiving a photographing operation; wherein the first viewfinder frame is one of the M viewfinder frames, and the second viewfinder frame is one of the N-M viewfinder frames except for the M viewfinder frames in the N viewfinder frames.

9. The terminal according to claim 6, wherein the computer program, when executed by the processor, causes the terminal to further perform:

photographing through the terminal to acquire one photographing result; and the computer program, when executed by the processor, causes the terminal to perform:

acquiring images displayed in N-1 viewfinder frames respectively to acquire N-1 photographing results; and taking the one photographing result and the N-1 photographing result as N photographing results acquired through the N viewfinder frames.

10. The terminal according to claim 6, wherein the computer program, when executed by the processor, causes the terminal to further perform:

in a case of receiving a third operation of a user for a first result in the N photographing results, displaying a text editing box in the first result.

11. A non-transitory computer-readable storage medium, wherein the non-transitory computer-readable storage medium stores a computer program; and the computer program, when executed by a processor of a terminal, causes the terminal to perform:

receiving a first operation for a target photographing template, wherein the target photographing template comprises N viewfinder frames and N is an integer greater than 1;

acquiring N photographing results through the N viewfinder frames, wherein the N photographing results comprise M photos and N-M videos, and M is a positive integer less than N; and splicing the N photographing results according to positions of the N viewfinder frames in the target photographing template in a case of receiving a second operation to acquire a synthesized object;

acquiring images displayed in J viewfinder frames of the N viewfinder frames respectively to acquire J photographing results; and performing copy processing on M photographing results in the J photographing results to acquire K photographing results corresponding to K viewfinder frames, a sum of J and K being equal to N, and M being less than or equal to K.

12. The non-transitory computer-readable storage medium according to claim 11, wherein the computer program, when executed by the processor, causes the terminal to perform:

in a case of receiving a first sliding operation sliding from a t-th viewfinder frame to an h-th viewfinder frame, copying the photographing result corresponding to the t-th viewfinder frame to the h-th viewfinder frame to acquire the photographing result of the h-th viewfinder frame; or in a case of receiving a second sliding operation sliding from the t-th viewfinder frame to the h-th viewfinder frame, copying the photographing result corresponding to the t-th viewfinder frame to a target viewfinder frame to acquire the photographing result of the target viewfinder frame, the target viewfinder frame comprising all the viewfinder frames except for the t-th viewfinder frame on a sliding route of the second sliding operation; wherein the photographing result corresponding to the t-th viewfinder frame is one of the M photographing results in the J photographing results, and the h-th viewfinder frame is one of the K viewfinder frames.

13. The non-transitory computer-readable storage medium according to claim 11, wherein the computer program, when executed by the processor, causes the terminal to perform:

in a case that an image type which a first viewfinder frame in the N viewfinder frames is correspondingly set is a photo in the target photographing template, acquiring the photo through the first viewfinder frame in a case of receiving a photographing operation; and in a case that an image type which a second viewfinder frame in the N viewfinder frames is correspondingly set is a video in the target photographing template, acquiring the video through the second viewfinder frame in a case of receiving a photographing operation; wherein the first viewfinder frame is one of the M viewfinder frames, and the second viewfinder frame is one of the N-M viewfinder frames except for the M viewfinder frames in the N viewfinder frames.

14. The non-transitory computer-readable storage medium according to claim 11, wherein the computer program, when executed by the processor, causes the terminal to further perform:

photographing through the terminal to acquire one photographing result; and the computer program, when executed by the processor, causes the terminal to perform:

acquiring images displayed in N-1 viewfinder frames respectively to acquire N-1 photographing results; and taking the one photographing result and the N-1 photographing result as N photographing results acquired through the N viewfinder frames.

15. The non-transitory computer-readable storage medium according to claim 11, wherein the computer program, when executed by the processor, causes the terminal to further perform:

in a case of receiving a third operation of a user for a first result in the N photographing results, displaying a text editing box in the first result.

* * * * *